No. 618,109. Patented Jan. 24, 1899.
C. LICHTI.
HARROW.
(Application filed Apr. 22, 1898.)
(No Model.)

Witnesses:
M. R. Remley
F. S. Thrasher

Inventor:
C. Lichti
By Higdon, Fischer & Thorpe
Attys.

UNITED STATES PATENT OFFICE.

CHRISTIAN LICHTI, OF MOUNDRIDGE, KANSAS.

HARROW.

SPECIFICATION forming part of Letters Patent No. 618,109, dated January 24, 1899.

Application filed April 22, 1898. Serial No. 678,463. (No model.)

*To all whom it may concern:*

Be it known that I, CHRISTIAN LICHTI, of Moundridge, McPherson county, Kansas, have invented certain new and useful Improvements in Harrows, of which the following is a specification.

My invention relates to harrows, and my object is to provide a harrow; whereby the entire surface of a field may be thoroughly harrowed without requiring the harrow to be drawn across the same surface a second time.

A further object is to produce a harrow of this type which is extremely simple, strong, durable, and inexpensive of manufacture.

To this end the invention consists in certain novel and peculiar features of construction and combinations of parts, as will be hereinafter described and claimed, and in order that it may be fully understood I will proceed to describe it with reference to the accompanying drawings, in which—

Figure 1:
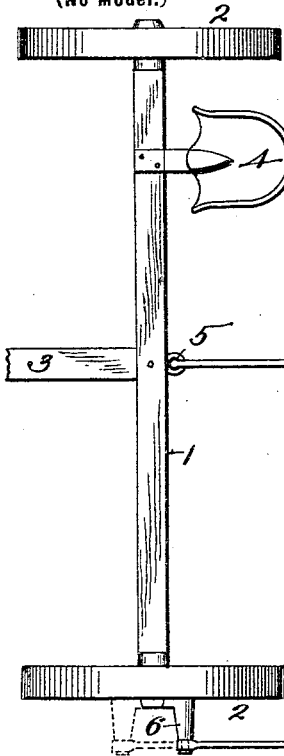
Figure 1:
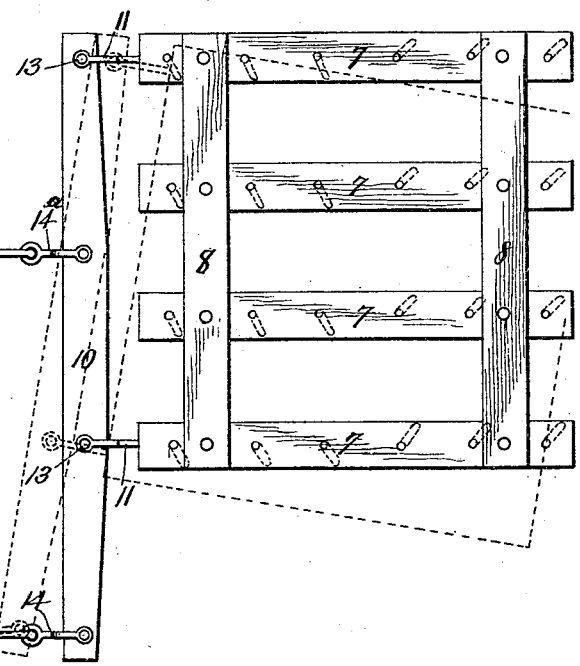
Figure 2:
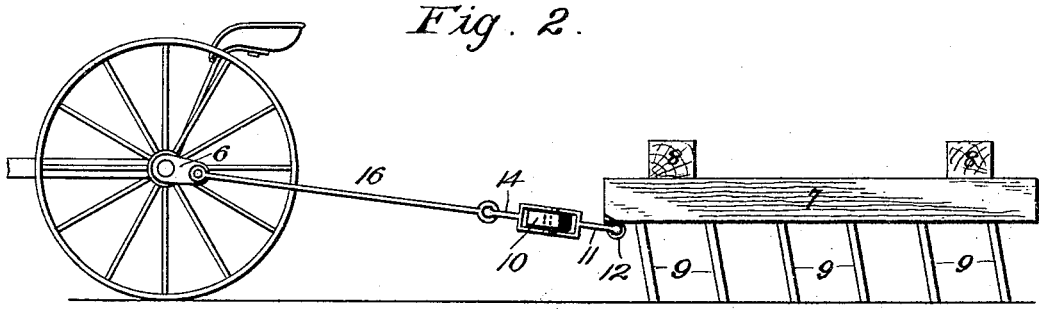

Figure 1 represents a top plan view of a harrow constructed in accordance with my invention. Fig. 2 represents a side elevation of the same.

In the said drawings is shown a vehicle comprising an axle 1, carrying wheels 2, tongue 3, and seat 4. It is also provided centrally with the rearwardly-projecting eyebolt 5 and with a crank-arm 6, mounted, preferably, upon the hub of one of the wheels.

The harrow proper comprises the longitudinal timbers or bars 7, transverse connecting-bars 8, and depending teeth 9, which may be of any suitable or preferred construction. The teeth, by preference, slope rearwardly, and some of them are bent inwardly and others outwardly, as indicated in dotted lines, Fig. 1, to the end that the surface traversed by the harrow may be thoroughly operated upon.

10 designates an equalizing-bar, and 11 links which are pivotally connected at their rear ends to the eyebolts 12 at the front end of the harrow and at their front ends to said equalizing-bar, as at 13, one of the pivotal points 13 being near the end of the bar and the other at a point two-thirds the length of the bar from said end. 14 and 14$^a$ designate a pair of links which are pivoted to said bar at its opposite end and midway between the pivotal points 13, and the link 14$^a$ is connected pivotally by a tie-rod 15 to eyebolt 5 and the link 14 by tie-rod 16 to the crank-arm 6. By this arrangement it is obvious that the link 14$^a$ forms the fulcrum for the pivotal operation of the bar 10 and that the link 14, through the medium of the actuating-crank 6 and connecting-rod 16, causes said bar to oscillate continuously upon said fulcrum, and therefore causes the harrow to alternately assume the extremes of position indicated by full and dotted lines, this lateral movement of the harrow insuring that the ground between the sets of teeth 9 shall be thoroughly harrowed as well as that lying directly in the path of said teeth.

From the above description it will be apparent that I have produced a harrow which embodies the features of advantage enumerated in the statement of invention, and it is to be understood, of course, that I reserve the right to make such changes in the same as are not a departure from its spirit and scope.

Having thus described the invention, what I claim as new, and desire to secure by Letters Patent, is—

1. A harrow, comprising a wheeled frame, a harrow proper arranged to trail behind the same, a bar fulcrumed centrally of the line of draft and connected to said wheeled frame, links pivotally connecting said bar at opposite sides of said fulcrum with the harrow, and a crank connected also to said bar and adapted to oscillate it continuously as the machine is drawn across the field, substantially as described.

2. A harrow, comprising a wheeled frame provided with a seat and a crank, a harrow proper provided with staggered teeth, a transverse bar arranged between the wheeled frame and the harrow, a link pivoted to the same at a point in the center of the line of draft, a tie-rod pivotally connecting said link with the wheeled frame at its center, links pivotally connected to said bar at opposite sides of and an equal distance from said fulcrum-link and to the harrow, a link pivoted to the end of the bar at the side of the machine corresponding to the location of the crank, and a rod pivotally connecting said link and said crank, substantially as shown and described.

In testimony whereof I affix my signature in the presence of two witnesses.

CHRISTIAN LICHTI.

Witnesses:
J. J. EYMANN,
G. H. EBERLE.